United States Patent Office 3,390,391
Patented June 25, 1968

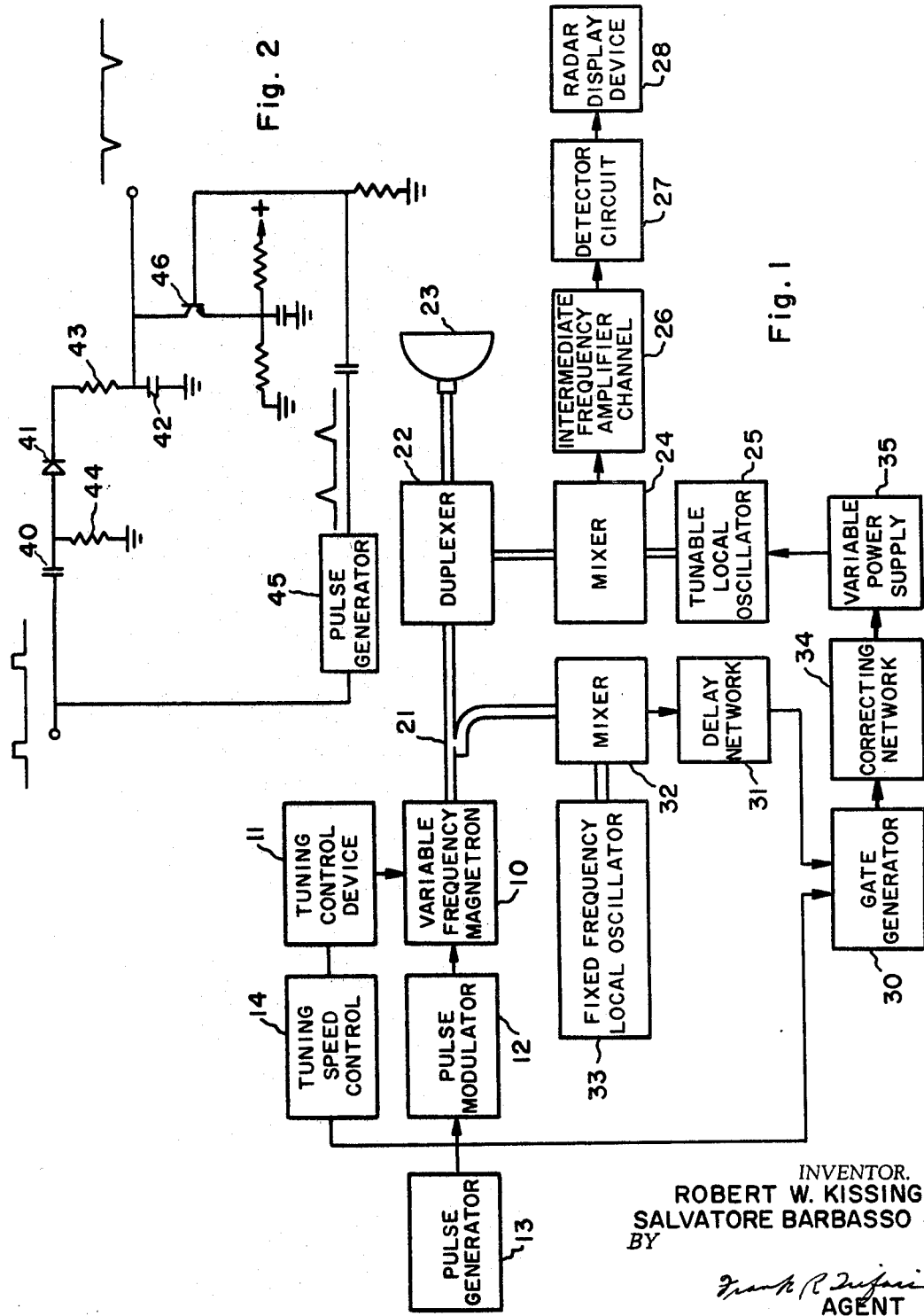

1

3,390,391
RADAR SYSTEM EMPLOYING VARIABLE
FREQUENCY PULSES
Robert W. Kissinger, West Islip, and Salvatore Barbasso, Jr., Bayshore, N.Y., assignors to North American Philips Company, Inc., New York, N.Y., a corporation of Delaware
Filed Nov. 5, 1965, Ser. No. 506,524
7 Claims. (Cl. 343—17.2)

ABSTRACT OF THE DISCLOSURE

In a pulse radar system of the type in which the carrier frequency of successive pulses is continuously varied (i.e. frequency-agile radar), the problem arises of varying the local oscillator with the carrier frequency to maintain a constant intermediate frequency. In the disclosure a system is described in which the pulses are applied to a highly dispersive delay line which delays the pulses as a function of frequency. This variable delay is employed to derive a control voltage that varies with carrier frequency, and the control voltage is employed to control the local oscillator.

---

This invention relates to radar systems, and more particularly to radar systems of the type in which the radio frequency energy is transmitted in the form of periodic pulses and the carrier frequency of the energy of successive pulses is continuously varied.

Radar systems of this type provide a number of advantages. For example, when the frequency of the pulse energy is varied in an arbitrary manner, it is more difficult for the system to be disabled by jamming signals. In addition, continuous variation of the pulse energy frequency greatly reduces or eliminates the mutual interference of adjacent radar systems, and frequency dependent background response is greatly diminished.

One of the problems involved in the design of radar systems of this type is the provision of local oscillations for mixing with the echo signals to produce an intermediate frequency signal. When a rotary-tuned magnetron, for example of the type disclosed in U.S. Patent No. 2,931,943, is employed to generate the transmitted radio frequency signals, the frequency band of the transmitted pulses may be as great as ten percent. With such a wide variation of frequency, it is apparent that the frequency of the local oscillator must also vary, since it is not practicable to provide an intermediate frequency amplifier having a bandwidth as great as ten percent of the frequency of the radio frequency energy. It is necessary, then, to provide some means for controlling the relationship between the frequency of the transmitted pulses and the frequency of the local oscillator during the echo period.

According to the invention, a radar system is provided having a source of pulses of high frequency oscillations of continuously varying frequency. Means are provided for transmitting the oscillations, and for receiving echo signals reflected from targets. The echo signals are mixed with oscillations from a variable frequency local oscillator in order to provide an intermediate frequency video signal. In order to control the frequency of the local oscillator so that the intermediate frequency signals have a substantially constant frequency, a control voltage is provided having an amplitude that is a function of the frequency of the transmitted high frequency oscillations. This control voltage is obtained by applying a portion of the high frequency oscillations to a highly dispersive delay network in order to derive a pulse signal in which the pulses have widths that vary as a function of the transmitted oscillations. The delay network has a delay characteristic that varies as a function of the high frequency oscillations. Means are then provided for producing the control voltage having an amplitude dependent upon the width of the variable width pulses.

In order that the invention may be more clearly understood, it will now be described in greater detail with reference to the accompanying drawing, in which:

FIG. 1 is a block diagram of a radar system according to the invention; and

FIG. 2 is a circuit diagram of a correction network that may be employed in the system of FIG. 1.

Referring now to the drawings, and more particularly to FIG. 1, therein is illustrated a radar system comprising a variable frequency transmitter oscillator 10. The oscillator 10 may comprise, for example, a rotary-tuned magnetron of the type disclosed in U.S. Patent No. 2,931,943. The invention is not limited, however, to the use of this specific type of oscillator. The tuning frequency of the oscillator 10 is continuously varied within a predetermined frequency band by means of a continuously operating tuning control device 11. When the oscillator 10 is a rotary-tuned magnetron, the tuning control device 11 may be a continuously running motor.

The transmitter oscillator 10 is periodically energized by a pulse modulator 12 of conventional construction, and the pulse modulator is in turn energized by a pulse generator 13, also of conventional construction. In order to insure that the frequency of the output pulses of the oscillator 10 varies in an arbitrary manner, it may be desirable to control the speed of the tuning control device 11 as a function of the output of the pulse generator 13 by means of a tuning speed control device 14 such as a motor speed control circuit. Alternatively, the speed of the motor may be constant and the pulse rate of the output of the pulse generator 13 may be random. The manner of controlling the variation of the frequency of the output pulse energy of the oscillator, however, is not material to the present invention.

The output energy of the oscillotor 10 is applied by way of a conventional directional coupler 21 to a duplexer 22, also of conventional construction, and thence to an antenna 23. Echo signals returned to the antenna 23 are applied by way of the duplexer 22 to a mixer 24, wherein they are mixed with the output oscillations of a tunable local oscillator 25 to provide an intermediate frequency video signal. The output of the mixer is applied in the conventional manner to an intermediate frequency amplifier channel 26 and thence to a detector circuit 27 and a radar display device 28.

The tunable local oscillator 25 is preferably an oscillator that may be rapidly tuned over a wide frequency range by electronic means. For this purpose, a backward wave oscillator may be employed, although other oscillator devices having the necessary tuning characteristics may be employed without departing from the spirit or scope of the invention.

In order to provide a control voltage for the tunable local oscillator that is a function of the frequency of the transmitted pulses, a gate generator 30 is provided for producing a pulse train synchronized with the transmitted pulses, with the widths of the pulses being proportional to the instantaneous frequency of the transmitted pulse signal occurring concurrently therewith. The gate generator 30 may, for example, comprise a conventional bistable circuit with one input trigger being derived from the pulse generator 13 and a second input trigger being delayed from the first trigger input by a time interval proportional to the transmitter oscillator frequency.

The second trigger signal for the gate generator 30 may be derived from a highly dispersive delay network 31 having a delay time that is proportional to frequency. In order to provide an input signal for the delay device that has a frequency related to the transmitter oscillator frequency but is within the operating frequency range of the delay device, a small portion of the transmitter oscillator high frequency energy is obtained by means of the directional coupler 21, and is mixed in a mixer 32 with the oscillations from a fixed frequency local oscillator 33. The local oscillator 33 is preferably an oscillator having very stable frequency, and may comprise, for example, a quartz crystal oscillator. The output from the mixer 32 is applied to the delay network 31.

As above-stated, the delay network 31 has a delay characteristic that is a function of the frequency of signals applied to its input terminals. Such characteristics are provided, for example, by lumped or distributed constant delay lines, quartz delay lines, or folded waveguide delay lines.

The output of the gate generator 30 is applied to a correction network 34 to provide a control voltage proportional to the width of the pulse output signals from the gate generator 30, and the control voltage output of the correction network is employed to control the frequency of the tunable local oscillator 25. For example, if the tunable local oscillator 25 is a backward wave oscillator, the control voltage may be employed to control the operating potential supplied by a variable voltage power supply 35 for the oscillator 25.

As an example of a correction network 34 for providing a control voltage proportional to the width of the output pulses from the gate generator 30, the output pulse signal from the gate generator may be applied by way of a coupling capacitor 40 and diode 41 to a series-connected charging capacitor 42 and resistor 43 (FIG. 2). The diode 41 is connected with the correct polarity to permit the charging capacitor 42 to charge by way of the resistor 43 only during the time that the input pulse occurs. If the charging of the capacitor 42 is linear, the voltage developed across this capacitor will be proportional to the width of an input pulse, and this voltage will be maintained after the occurrence of the pulse since the diode 41 then becomes nonconductive. Resistor 44 connected between the capacitor 40 and ground is provided in order to discharge capacitor 40 during the period between pulses. In order that the voltage across the charging capacitor responds correctly to the width of each pulse, it is necessary to discharge this capacitor after the useful echo time. This may be accomplished by deriving spike pulses from the leading edges of the output pulses from the gate generator 30, for example, by means of a pulse generator 45, and employing the pulse to make a transistor 46 in parallel with the capacitor 42 momentarily conductive. The transistor 46 may be provided with a fixed emitter bias so that the capacitor 42 does not fully discharge, thereby compensating for the effect of discharging the capacitor during the initial portion of the pulses received from the gate generator. The output voltage from the correction network thus will have a linear charging characteristic during the latter portion of the input pulse followed by a constant voltage characteristic during the echo period, and the constant voltage will be proportional to the width of the output pulses of the gate generator 30, and hence to the frequency of the transmitted oscillations.

In the operation of the system of FIG. 1, the tuning control device 11 continually varies the operating frequency of the transmitter oscillator, so that when the oscillator 10 is periodically energized by the modulator 12, the output pulses from the oscillator will have preferably random frequency variation. The high frequency pulse energy from the oscillator 10 is transmitted by means of the antenna 23. Substantially simultaneously with the initial energization of the transmitter oscillator, the pulse generator 13 energizes the gate generator 30 to form the leading edge of a frequency-dependent pulse. A portion of the output energy of the transmitter oscillator is applied, by way of the mixer 32, to the delay network, whereby the delayed output of the delay network triggers the gate generator 30 to form the trailing edge of the frequency-dependent pulse. Since the delay time of the delay network is proportional to the frequency of the signals applied to its input terminals, the width of the pulses at the output terminals of the gate generator will be proportional to the frequency of the pulses of high frequency energy being transmitted. A control voltage having a constant potential during the echo period that is proportional to the frequency of the transmitted energy is derived from the frequency-dependent pulses by means of the correction network 34.

The control voltage output from the correction network is employed to control the frequency of the tunable local oscillator 25, so that the returning echo signals are mixed in the mixer 24 to provide an intermediate frequency video signal having substantially constant frequency.

While the invention has been described with reference to a specific embodiment and specific examples, it will be obvious that variations may be made therein without departing from the spirit or scope of the invention, and it is intended that the invention not be limited to such specifically described arrangements. For example only, it will be obvious to one skilled in the art that other circuits may be employed to provide a control voltage responsive to the width of input pulses than the circuit specifically described with reference to FIG. 2.

What we claim as new and desire to secure by Letters Patent of the United States is:

1. A radar system comprising a source of pulses of high frequency oscillations, means for continuously varying the frequency of said pulses of high frequency oscillations whereby the carrier frequency of the energy of successive pulses is continuously varied, means for transmitting said pulses of high frequency oscillations, means for receiving echo signals, vairable frequency local oscillator means, means for producing a control voltage proportional to the frequency of said high frequency oscillations for controlling said variable frequency local oscillator means, said means for producing a control voltage comprising a highly dispersive delay means, means applying said pulses of high frequency oscillations to said delay means to provide delayed pulses, means connected to the output of said delay means for producing said voltage proportional to the delay of said delayed pulses, and means applying said control voltage to said local oscillator means, and means for mixing said echo signals with the oscillations of said local oscillator means to produce an intermediate frequency video signal, whereby said intermediate frequency signal is maintained at a substantially constant frequency.

2. A radar system comprising a source of pulses of high frequency oscillations, means for continuously varying the frequency of said pulses of high frequency oscillations whereby the carrier frequency of the energy of successive pulses is continuously varied, means for transmitting said pulses of high frequency oscillations, means for receiving echo signals, variable frequency local oscillator means, means for producing a control voltage proportional to the frequency of said high frequency oscillations for controlling said variable frequency local oscillator means, said means for producing a control voltage comprising highly dispersive delay line means, means for applying said pulses of high frequency oscillations to said delay line means to provide delayed pulses, gate means connected to the output of said delay line means for producing a pulse train of pulses having widths proportional to the instantaneous delay of said delayed pulses, means for producing a control voltage proportional to the widths of pulses of said pulse train, and means for applying said control voltage to said local oscillator means, and means for mixing said echo signals with the oscillations of said local oscillator means to produce an intermediate frequency video signal, whereby said intermediate frequency signal is maintained at a substantially constant frequency.

3. The radar system of claim 2, in which said local oscillator means is a backward wave oscillator.

4. A radar system comprising a variable frequency magnetron, means for varying the oscillation frequency of said magnetron, pulse generating means connected to energize said magnetron to produce sequential pulses of high frequency energy, means for transmitting said pulses of high frequency energy whereby the carrier frequency of the energy of successive pulses is continuously varied, means for receiving echo signals, voltage controllable variable frequency local oscillator means, a highly dispersive delay means, means applying said pulses of high frequency energy to said delay means, gate means, means connecting the output of said delay means and said pulse generating means to said gate means to produce a pulse train of pulses having leading edges occurring simultaneously with the leading edges of said sequential pulses and trailing edges determined by the delay of said sequential pulses in said delay means, means deriving a control voltage from said gate means responsive to the pulse width of the pulses of said pulse train, means applying said control voltage to said local oscillator means for controlling the oscillation frequency thereof, and means for mixing said received echo signals with the oscillations of said local oscillator means to produce an intermediate frequency video signal of substantially constant frequency.

5. The radar system of claim 4, in which said local oscillator means is a backward wave oscillator.

6. The radar system of claim 4, in which said means applying said pulses of high frequency energy to said delay means comprises means for converting the frequency of high frequency energy of said sequential pulses to a lower frequency.

7. In a radar system of the type comprising a source of pulses of high frequency oscillations, means for continuously varying the frequency of said pulses of high frequency oscillations whereby the carrier frequency of the energy of successive pulses is continuously varied, means for transmitting said pulses of high frequency oscillations, means for receiving echo signals, local oscillator means, and means for mixing said echo signals with the oscillations of said local oscillator means to produce an intermediate frequency video signal, the improvement comprising means for producing a control voltage proportional to the frequency of said high frequency oscillations for controlling the oscillating frequency of said local oscillator means, whereby said intermediate frequency signal has a substantially constant frequency, said means for producing a control voltage comprising highly dispersive delay means, means applying said pulses of high frequency oscillations to said delay means to provide delayed pulses, means connected to said delay means to produce a pulse train of pulses having widths proportional to the delay of said delayed pulses, and means for producing said control voltage from said pulse train whereby said control voltage is proportional to the widths of pulses of said pulse train.

References Cited

UNITED STATES PATENTS

| | | | |
|---|---|---|---|
| 3,140,489 | 7/1964 | Downie | 343—17.2 |
| 3,163,862 | 12/1964 | Jenny | 343—17.2 X |
| 3,179,935 | 4/1965 | Blass | 343—17.2 X |
| 3,261,969 | 7/1966 | Routh | 235—181 |
| 2,756,337 | 7/1956 | Shanahan | 343—14 X |
| 2,884,627 | 4/1959 | Ratcliffe | 343—7.5 |
| 3,044,061 | 7/1962 | Richmond et al. | 343—18 |

RODNEY D. BENNETT, *Primary Examiner.*

CHESTER L. JUSTUS, *Examiner.*

J. P. MORRIS, *Assistant Examiner.*